United States Patent [19]

Altschuler

[11] 4,369,283

[45] Jan. 18, 1983

[54] HIGH SOLIDS CAN COATING COMPOSITION CONTAINING EPOXY, ACRYLIC AND AMINOPLAST RESINS

[75] Inventor: Lili W. Altschuler, Wynnewood, Pa.

[73] Assignee: E. I. Du Pont de Nemours & Company, Wilmington, Del.

[21] Appl. No.: 241,092

[22] Filed: Mar. 6, 1981

[51] Int. Cl.³ .............................................. C08L 67/02
[52] U.S. Cl. ...................................... 524/451; 428/35; 524/512
[58] Field of Search .............. 260/21, 33.6 UA, 39 M; 525/163; 428/458, 35; 524/451

[56] References Cited

U.S. PATENT DOCUMENTS

| | | | |
|---|---|---|---|
| 3,037,963 | 6/1962 | Christenson | 260/72 |
| 3,382,294 | 5/1968 | Christenson et al. | 525/163 |
| 3,979,478 | 9/1976 | Gallacher | 525/163 |
| 4,032,698 | 6/1977 | Ashe | 526/14 |
| 4,072,662 | 2/1978 | van der Linde et al. | 260/75 R |
| 4,074,176 | 2/1978 | Parke et al. | 318/371 |
| 4,104,240 | 8/1978 | Buter | 260/39 |
| 4,192,826 | 3/1980 | Beresniewicz, et al. | 525/425 |

FOREIGN PATENT DOCUMENTS 1561076  2/1980  United Kingdom .

*Primary Examiner*—Theodore E. Pertilla

[57] ABSTRACT

A high solids coating composition comprising defined acrylics, polyester, reactive diluent, aminoplast, catalyst and pigment including talc and TiO$_2$ is particularly suitable for use as an exterior can coating which is baked repetitively to cure multiple ink applications.

11 Claims, No Drawings

HIGH SOLIDS CAN COATING COMPOSITION CONTAINING EPOXY, ACRYLIC AND AMINOPLAST RESINS

BACKGROUND OF THE INVENTION

A coating composition intended for use on the outside of cans as a base for printing labels with multiple colors of inks must meet several stringent requirements. One of the requirements is good adhesion to the substrate which may be aluminum, electrolytically tin-plated steel, tin-free steel, or other materials. Also, multicolor labels often require baking a number of times to cure each color printing before the next is applied. Coating compositions used as a base coat, generally white, to be subjected to such multiple bakes, must not exude any ingredients that would interfere with the inks. Moreover, the base coat must cure fast enough for economical high speed production. Furthermore, a rather high level of pigmentation is needed to provide white opacity for the printing base, and a high solids content is desirable to minimize solvents which are costly and can contribute to air pollution.

More or less flexibility is also needed in the cured coating composition. For three-piece cans, most of the can forming is done after applying the base coat and also the ink patterns. Thus, coatings for three-piece cans need to be quite flexible. The body of a three-piece can is generally formed from base coated and printed flat metal stock which is cut to size, rolled to form a cylinder, and a seam is made. The other two pieces in a three-piece can are the ends. One is applied before filling the can, the other after. Coatings for two-piece cans still require flexibility, but less so than those for three-piece cans. The body of a two-piece can is made by drawing and ironing a cup-shaped body from a flat sheet of metal. The outside of this formed body is the part to which the base coat of the invention is applied. A flat top is provided to be sealed onto the can after the can has been filled. In the sealing of this top, some flexibility of the base coat on the can body is desirable.

The ideal combination of adhesion to the substrate, minimal exudation upon multiple bakes, and opacity in thin flexible coatings that cure rapidly is not easy to produce in a high solids coatings. Adequate dispersion stability is also necessary for commercial success. Exterior can coatings differ from other finishes such as automotive and exterior architectural finishes in the ways described above and also in not needing similar durability to weather, ultraviolet light and physical abuse.

Prior exterior can finishes often used pigment dispersants and flow control agents which tended to exude and interfere with printed ink patterns on multiple bakes to cure multiple layers of ink. The interference would cause the ink and the overlying clear varnish to lift off. Adhesion to the substrate was also inadequate.

SUMMARY OF THE INVENTION

The present invention provides a high solids coating composition comprising:

A. a vehicle blend consisting essentially of:
1. from about 5 to about 22% by weight of acrylic polymer having a weight average molecular weight of at least about 50,000 determined by gel permeation chrometography using a polystyrene standard,
2. from about 25 to about 50% by weight of polyester formed by reacting an aromatic or cycloaliphatic dicarboxylic acid with a diol having 3 to 10 carbon atoms,
3. from about 5 to about 15% by weight of saturated reactive diluent containing hydroxyl groups,
4. from about 20 to about 50% of an aminoplast resin,
5. pigments comprising $TiO_2$ and talc in proportions of from about 10 to about 90% by weight of each, the ratio of pigments to vehicle solids being in the range of about 0.8:1 to 1.4:1 by weight,
6. from about 0.2 to about 2.0% by weight of a catalyst of alkylaromatic polysulfonic acid; and B. aliphatic and aromatic hydrocarbon solvents; said coating composition having a solids contents of at least about 70% by weight, preferably at least 75%, more preferably at least 80%.

Preferably
the acrylic is a formylated, butylated copolymer of the following monomer units in the approximate weight proportions indicated:
styrene: 14.3
methyl methacrylate: 14.3
ethyl acrylate: 58.7
acrylic acid: 2.2
acrylamide: 5.7
40% formaldehyde+60% butanol: 4.8
with a number average molecular weight of about 25,000 and a weight average molecular weight of about 90,000, provided at from about 8 to 20% by weight;
the polyester is the isophthalic ester of 2,2,4-trimethyl-pentant-1,3-diol wherein n has an average value of about 1, provided at from about 40 to about 50% by weight;
the reactive diluent is castor oil which has not been dehydrated, provided at from about 8 to about 12% by weight;
the melamine crosslinker is a butylated, methylated melamine, provided at from about 20 to about 50% by weight;
the pigment to vehicle ratio is from about 1.0 to about 1.0:1 to about 1.2:1, and the pigment is about 80% $TiO_2$ and 20% talc by weight, provided at from about 40 to about 60% by weight of each of $TiO_2$ and talc; and
the catalyst is dinonylnaphthalene disulfonic acid with a molecular weight of about 500, as a 46% by weight solution in isobutanol, provided at from about 0.5% by weight.

DETAILED DESCRIPTION

The compositions of the present invention provide improved responses to the problems of the prior art by, among other things, omitting certain dispersants, flow control agents, and soft polyesters and adding talc to improve adhesion to the substrate. This permits higher pigment to binder or pigment to vehicle ratios with good dispersion stability, high adhesion to the substrate, fast cure, and low exudation upon multiple ink bakings, to give a thin, economical coating with good flexibility.

Broadly defined acrylics can be used with the present invention, preferably those that cure through an acrylamide. Acrylic polymers used in the invention, and their preparation, are described more fully in U.S. Pat. No. 3,037,963 Christenson, granted June 5, 1962.

The polyesters used herein are those of part A of claim 1 of U.S. application Ser. No. 947,183, filed Sept. 29, 1978, and of British Pat. No. 1,561,076, published Feb. 13, 1980, such as the isophthalic ester of 2,2,4-trimethylpentane-1,3-diol. This is a relatively hard polyester compared to the mixed ester of 2,2,4-trimethylpentane-1,3-diol and a mixture of dimethyl aliphatic carboxylates as defined in part B of claim 1 of that application. Also useful are the polyesters of U.S. Pat. No. 4,072,622 van der Linde et al, granted Feb. 7, 1978 and of U.S. Pat. No. 4,104,240-Buter, granted Aug. 1, 1978.

Such polyesters are also disclosed for use with blocked acid catalysts in U.S. Pat. No. 4,192,826—Beresniewicz, granted Mar. 11, 1980. The catalysts of this patent, including American Cyanamid Catalyst 600 are useful in the present invention, but more preferred are those of U.S. Pat. No. 4,074,176—Gallacher, granted Feb. 21, 1978 and related U.S. Pat. Nos. 4,083,830, 4,098,950, 4,200,729 and 3,979,478, concerned with amine-blocked dinonylnaphthalene disulfonic acid or American Cyanamid's Catalyst 500.

The preferred aminoplast resins used as crosslinkers, include partially methylated melamines, partially butylated melamines, hexaethoxymethylmelamine, hexamethoxymethylmelamine, dimethoxytetraethoxymethylmelamine, dibutoxytetramethoxymethylmelamine, butylated benzoguanamine, partially methylated urea, fully methylated urea, fully butylated urea, hexabutoxymethylmelamine, and mixtures thereof. More preferred are fully albylated melamines. The commercially available preferred nitrogen resins include the following products of American Cyanamid Co.:

Cymel® 303: hexamethoxy methyl melamine
Cymel® 1116: highly methylated and ethylated melamine
Cymel® 1130: highly butylated melamine
Cymel® 1156: highly butylated melamine
Cymel® 1133: methylated and ethylated polymeric benzoguanamine
Beetle® 80: highly butylated urea flormaldehyde The dispersants used in the prior art and eliminated from the compositions of the present invention include nonresinous pigment dispersants of U.S. Pat. No. 4,032,698—Ashe, granted June 28, 1977, especially the amine-terminated materials of Example 4. Such pigment dispersants tended to exude out of the coatings upon multiple bakes and cause lifting of the inks and overlying clear varnishes. However, without the pigment dispersant, it is necessary to omit the softer polyesters of section B of claim 1 of U.S. application Ser. No. 947,183, filed Sept. 29, 1978, which are less helpful in stabilizing the dispersion.

The term "consisting essentially of" herein means in the absence of ingredients which materially affect the basic and novel characteristics of the invention including the ability to provide exterior can coatings which minimize the problems of the prior art recited above. Substrate wetting and flow are generally satisfactory. Silicone additives to aid in wetting difficult-to-wet substrates, fillers and other ingredients can be among the ingredients permitted by the term consisting essentially of.

As an example of the invention, the ingredients listed below were mixed to form a pigment dispersion, and the ingredients listed in Letdown were added and mixed in to form the coating composition. The pigment:vehicle (binder) ratio is given as P:B in terms of X:100. Percentages and proportions herein are by weight except where indicated otherwise.

EXAMPLE 1

TABLE 1

| INGREDIENT | WEIGHT % |
|---|---|
| P:B 102.4, 80.5% Solids | |
| PIGMENT DISPERSION | |
| 1 Acrylic: ST/MMA/EA/AA/AMIDE/FORMYLATED/BUTYLATED 14.3/14.3/58.7/2.2/5.7/4.8 (1) | 6.85 |
| 2 Hydrocarbon solvent-Exxon® Aromatic 150 boiling range 188–219° C. | 7.03 |
| 3 Hydrocarbon solvent-Exxon Aromatic 100 boiling range 150–190° C., 95% aromatic | 2.65 |
| 4 Diacetone Alcohol | 1.70 |
| 5 Castor Oil (2) | 4.48 |
| 6 Hexamethoxy Methyl Melamine (3) | 5.60 |
| 7 Hydrous Magnesium Silicate Fine Particle Size Talc | 8.15 |
| 8 Titanium Dioxide | 32.46 |
| LETDOWN | |
| 9 TIP Oligomer, Reaction Product of Trimethylol Pentane Diol and Isophthalic Acid (4) | 21.08 |
| 10 Hexamethoxy Methyl Melamine | 5.60 |
| 11 Hydrocarbon solvent Exxon Aromatic 100 | 2.83 |
| 12 Catalyst 500, 41% Sol. of Dinonyl Naphthalene Disulfonic Acid in Isobutanol | 0.49 |
| 13 Methyl Diethanol Amine (5) | 0.06 |
| TOTAL | 100.00 |

(1) Mn 25,000 Mw 90,000; 55% Solids in Aromatic Hydrocarbon/Butanol 48/52.
(2) Functions as a reactive diluent, reacting through hydroxyl group; it also improves flow.
(3) 100% Solids - Cymel 303 or Resimene 747.
(4) 90% Solids in Aliphatic Hydrocarbon/Toluene 70/30.
(5) Neutralizes the Sulfonic Acid for package stability.

Examples 2 and 3 are given in Table 2 below for the same ingredients.

TABLE 2

| INGREDIENT | EXAMPLE 2 P/B - 119.6, SOLIDS 81.7% WEIGHT % | EXAMPLE 3 P/B - 101.1, SOLIDS 81.9% WEIGHT % |
|---|---|---|
| PIGMENT DISPERSION | | |
| 1 | 6.49 | 6.94 |
| 2 | 6.56 | 7.12 |
| 3 | 3.04 | 1.34 |
| 4 | 1.60 | 1.73 |
| 5 | 4.23 | 4.55 |
| 6 | 5.27 | 5.68 |
| 7 | 7.40 | 8.26 |
| 8 | 37.08 | 32.91 |
| LETDOWN | | |
| 9 | 19.70 | 21.80 |
| 10 | 6.21 | 6.85 |
| 11 | 1.91 | 2.25 |
| 12 | 0.46 | 0.50 |
| 13 | 0.05 | 0.07 |
| | 100.00 | 100.00 |

Table 3 below shows results of comparative tests between compositions of the invention (tests 12 and 13) and compositions outside the invention (tests 4-11 and 14). Resin ingredients 1, 9, 5 and 10 are as in Table 1. Resin ingredient 14 is the mixed ester low molecular weight polyester of part B of claim 1 of U.S. Ser. No. 947,183, filed Sept. 29, 1978.

These tests show the advantages of omitting flow control agents, represented by Monsanto's "Modaflow", pigment dispersants described above, and resin ingredient 14, and including talc and castor oil.

In the tests, relative adhesion values are given for adhesion of the coating to electrolytic tin plate (ETP) and adhesion of a clear varnish of acrylic, alkyd or polyester crosslinked with melamine or other nitrogen resins. The varnish is applied over a printed base coat of the invention. Curing ability is measured by curing a base-coated ETP substrate 10 minutes at 175° C. and determining the number of times a cloth soaked with methyl isobutyl ketone can be rubbed on the coating with standard medium finger pressure until the metal shows through.

TABLE 3
COMPARATIVE TESTS

| TEST | PIGMENT | RESIN INGREDIENTS | | | | | MODAFLOW® FLOW CONTROL | PIGMENT DISPERSANT | ADHESION | | CURE 10' × 175° C. MEK RUBS | FLOW |
|---|---|---|---|---|---|---|---|---|---|---|---|---|
| | | 1 | 9 | 14 | 5 | 10 | | | VARNISH | TO ETP | | |
| 4 | TiO₂ | — | 38.6 | 20.7 | 10.2 | 30.4 | Present | Present | Poor | Poor | 10–20 | V.Good |
| 5 | TiO₂ | 21.0 | 50.0 | — | — | 29.0 | No | No | Excell. | Poor | 100+ | Poor |
| 6 | TiO₂ | 21.0 | 50.0 | — | — | 29.0 | No | Present | Poor | Poor | 100+ | Poor |
| 7 | TiO₂ | 21.0 | 50.0 | — | — | 29.0 | Present | No | Poor | Poor | 100+ | Poor |
| 8 | TiO₂ | 20.0 | 33.5 | 16.5 | — | 30.0 | No | No | Excell. | Poor | 20 | Fair |
| 9 | TiO₂ | 21.0 | 27.4 | — | 22.5 | 29.1 | No | No | Excell. | Poor | 8 | Good |
| 10 | TiO₂ | 20.0 | 26.8 | 13.2 | 10.0 | 30.0 | No | No | Excell. | Poor | 10 | Good |
| 11 | TiO₂ + Talc | 20.2 | 49.0 | — | — | 30.8 | No | No | Excell. | Good | 100+ | Poor |
| 12 | TiO₂ + Talc | 20.2 | 39.2 | — | 9.8 | 30.8 | No | No | Excell. | Good | 70 | Good |
| 13 | TiO₂ + Talc | 9.6 | 48.0 | — | 11.4 | 31.0 | No | No | Excell. | Good | 45 | Good |
| 14 | TiO₂ + Talc | 9.6 | 40.0 | 8.0 | 11.4 | 31.0 | No | No | Excell. | Good | 32 | Good |

I claim:

1. A high solids exterior can coating composition consisting essentially of:
A. a vehicle blend consisting essentially of:
  1. from 5 to 22% by weight of acrylic polymer having a weight average molecular weight determined by gel permeation chrometography using a polystyrene standard, of from at least 50,000 to 90,000,
  2. from 25 to 50% by weight of polyester having the structure:

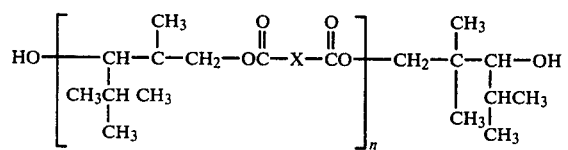

or the isomer through the secondary hydroxyl group or mixtures thereof, wherein X=

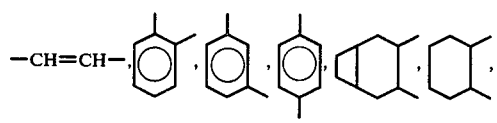

and wherein n=0–10 and at least 70% by weight is n=3 or less provided that only a maximum of 25% by weight of n=0; and wherein the polyester has a number average molecular weight not exceeding 1,000, determined by gel permeation chromatography using a polypropylene glycol standard;
  3. from 5 to 15% by weight of castor oil which has not been dehydrated;
  4. from 20 to 50% of an aminoplast resin;
  5. pigments comprising TiO₂ and talc in proportions of from 10 to 90% by weight of each, the ratio of pigments to vehicle solids being in the range of 0.8:1 to 1.4:1 by weight; and
  6. from 0.2 to 2.0% by weight of a catalyst which is a blocked sulfonic acid catalyst wherein the sulfonic acid is selected from the group consisting of methane sulfonic acid, paratoluene sulfonic acid alkyl benzene sulfonic acid wherein the alkyl group contains 2–12 carbon atoms, and 2-methacryloxyethyl sulfonic acid, its homopolymers and copolymers; and
B. aliphatic and aromatic hydrocarbon solvents; said coating composition having a solids contents of at least 70% by weight.

2. The composition of claim 1 wherein the polyester has the structure:

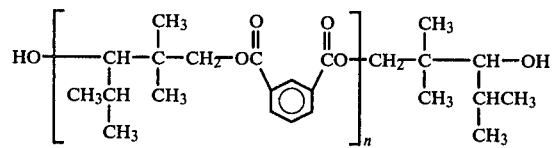

its isomer through the secondary hydroxyl group or mixtures thereof, wherein n=0–10 and at least 65% by weight is n=3 or less and provided that 10–20% by weight of n=0.

3. The composition of claim 2 wherein the polyester is the isophthalic ester of 2,2,4-trimethylpentane-1,3-diol wherein n has an average value of about 1.

4. The composition of claim 1 wherein the aminoplast resin of A.4. is a hexamethoxy methyl melamine.

5. The composition of claim 1 wherein the acrylic resin of A.1. is a formylated, butylated copolymer of the following monomer units in the approximate weight proportions indicated:
styrene: 14.3
methyl methacrylate: 14.3
ethyl acrylate: 58.7
acrylic acid: 2.2
acrylamide: 5.7
40% formaldehyde + 60% butanol: 4.8
with a number average molecular weight of about 25,000 and a weight average molecular weight of about 90,000.

6. The composition of claim 1 wherein the pigment to vehicle ratio is from about 1.0 to about 1.0:1 to about 1.2:1.

7. The composition of claim 6 wherein the pigment is about 80% TiO$_2$ and 20% talc by weight.

8. The composition of claim 6 wherein the pigment is about 50% TiO$_2$ and 50% talc by weight.

9. The composition of claim 1 wherein the catalyst of A.6. is dinonylnaphthalene disulfonic acid with a molecular weight of about 500.

10. The composition of claim 1 wherein
A.1. is a copolymer of the following monomer units in the approximate weight proportions indicated:
styrene: 14.3
methyl methacrylate: 14.3
ethyl acrylate: 58.7
acrylic acid: 2.2
acrylamide: 5.7
40% formaldehyde + 60% butanol: 4.8
with a number average molecular weight of about 25,000 and a weight average molecular weight of about 90,000;
A.2. is the isophthalic ester of 2,2,4-trimethylpentane-1,3-diol;
A.3. is castor oil which has not been dehydrated;
A.4. is a hexamethoxy methyl melamine;
A.5. the pigment to vehicle ratio is from about 1.0 to about 1.0:1 to about 1.2:1;
A.6. is dinonylnaphthalene disulfonic acid with a molecular weight of about 500, as a 46% by weight solution in isobutanol; and
B. the coating composition has a solids content of at least about 75% by weight.

11. The composition of claim 10 wherein
A.1. is from about 8 to about 20% by weight;
A.2. is from about 40 to 50% by weight;
A.3. is from about 8 to about 12% by weight;
A.4. is from 20 to 50% by weight;
A.5. is made up of from about 40 to about 60% by weight of each of TiO$_2$ and talc;
A.6. is about 0.5% by weight; and
B. the coating composition has a solids contents of at least about 80% by weight.

* * * * *